T. A. DE VILBISS.
SPRAYING INSTRUMENT.
APPLICATION FILED MAY 28, 1917.

1,247,088.

Patented Nov. 20, 1917.

INVENTOR
Thomas A. DeVilbiss,
By Owen, Owen & Crampton.
His attys.

UNITED STATES PATENT OFFICE.

THOMAS A. DE VILBISS, OF TOLEDO, OHIO, ASSIGNOR TO THE DE VILBISS MANUFACTURING COMPANY, OF TOLEDO, OHIO, A CORPORATION OF OHIO.

SPRAYING INSTRUMENT.

1,247,088.  Specification of Letters Patent.  Patented Nov. 20, 1917.

Application filed May 28, 1917. Serial No. 171,545.

*To all whom it may concern:*

Be it known that I, THOMAS A. DE VILBISS, a citizen of the United States, and a resident of Toledo, in the county of Lucas and State of Ohio, have invented a certain new and useful Spraying Instrument; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a liquid atomizing instrument, and has primarily for its object the provision of an improved sanitary instrument of this character which is particularly adapted for use in heating and spraying liquid paraffin, or the like, over wounds or other surfaces.

The invention is fully described in the following specification and while in its broader aspect, it is capable of embodiment in numerous forms, a preferred embodiment thereof is illustrated in the accompanying drawings, in which—

Figure 1:
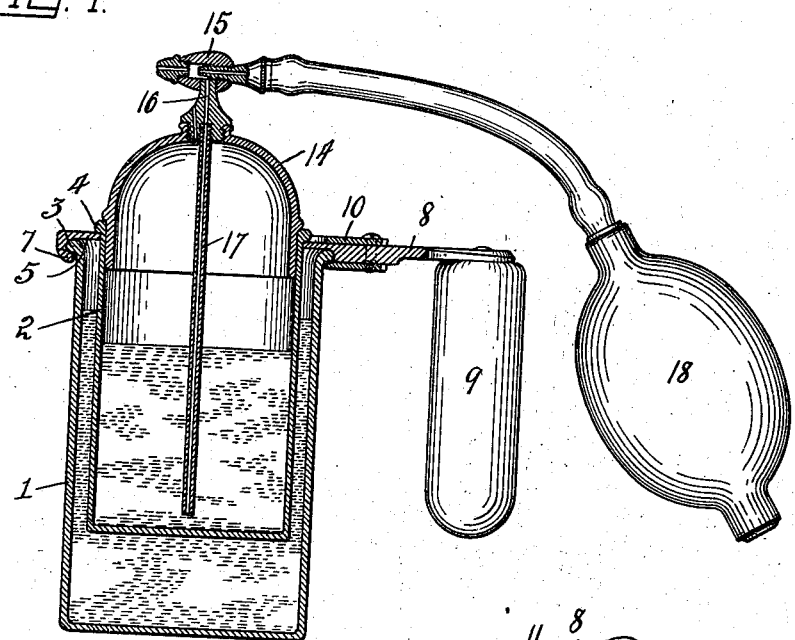
Figure 2:
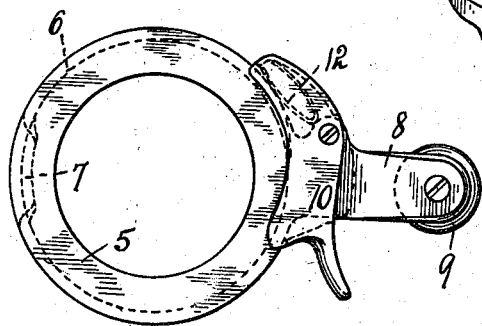
Figure 3:
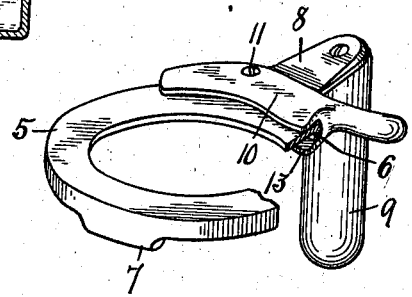

Figure 1 is a central vertical section of an instrument embodying the invention. Fig. 2 is a plan view of the receptacle carrying collar and attached parts, and Fig. 3 is a fragmentary perspective view thereof.

Referring to the drawings, 1 designates an open topped receptacle, preferably of cylindrical form, adapted to contain hot water, and 2 a similar receptacle for containing the liquid to be sprayed and being of a size adapted to be inserted into said receptacle in spaced relation to its sides and bottom, as shown. The receptacle 1 is provided at its upper end with an external annular bead or shoulder 3, and the receptacle 2 has its top open and provided with an external bead or shoulder 4.

The receptacle 2 is carried by a collar 5, being projected down through the opening thereof and having its bead 4 in stop contact therewith. This collar is of suitable size to rest on the rim of the receptacle 1 and coöperate with the receptacle 2 to form a closure for said first receptacle, and is provided at its outer edge with a flange 6 which fits down around the bead 3 of the receptacle 1 and has a lip 7 at one side for engaging under said bead. An arm 8 projects radially from the collar 5, substantially in diametrically opposed relation to the lip 7, and has a handle 9 projecting downward from its outer end. A catch member 10 is pivoted to the arm 8, as at 11, and is normally held in position by a spring 12 for a catch lug 13 on its bottom edge to engage under the bead 3, thus coöperating with the lip 7 to retain the collar to the rim of the receptacle 1.

The upper open end of the receptacle 2 is closed by a cap member 14, the lower edge of which removably fits into the receptacle. A spray-head 15 is mounted on the cap 14 and is in communication through a passage 16 and tube 17 with the interior of the receptacle 2 near its bottom. Air is supplied under pressure to the spray-head 15 from a compression bulb 18, or in other suitable manner. It is evident that the cap 14 and spray-head can be easily and quickly removed from the receptacle 2 to permit a filling and cleaning of the parts, and also that the receptacles 1 and 2 can be engaged or released in an easy and simple manner. It is also evident that compressing the bulb 18 will effect a discharge of air and liquid from the spray-head, the liquid being drawn from the receptacle 2 and discharged in spray-form, as will be understood in the art.

Having thus described my invention, what I claim is new and desire to secure by Letters Patent is—

1. In an instrument of the class described, two liquid receptacles, one capable of insertion into the other, and means having a handle and releasably engaged to both of said receptacles for carrying both in assembled relation or either separately from the other.

2. In an instrument of the class described, a receptacle for containing a liquid and having an open top, an atomizer receptacle for extending into said first receptacle, a collar member encircling the upper portion of said atomizer receptacle in releasable supporting engagement therewith and adapted to rest on the rim of the first receptacle and to coöperate with the atomizer receptacle to close the top of the first receptacle, said collar member having a handle part projecting therefrom, and means for releasably retaining said collar and first receptacle in assembled relation.

3. An instrument of the class described, comprising a main receptacle having an open op with an externally beaded rim, a collar for resting on said rim and having a lip for engaging under the bead thereof, a handle part on said collar, a catch member carried by said collar for releasably engaging said bead to coöperate with the lip to retain the collar in engagement therewith, a second receptacle carried by said collar and removably extending therethrough down into the main receptacle in spaced relation thereto, and means for discharging a liquid in spray form from said second receptacle.

4. An instrument of the class described, comprising a receptacle for containing a liquid and having an open top provided with an externally beaded rim, a collar for resting on the top of said receptacle and having an arm projecting outward and downward therefrom to form a handle and also having a lip for engaging under said bead substantially in opposition to said handle, a catch member pivotally carried by said handle and normally engaging under said bead, an open topped receptacle removably extending down through said collar into said first receptacle in spaced relation thereto and having an external stop means for coacting with said collar to limit the movement of the receptacle therethrough, a cap removably fitted into the top of said second receptacle and closing the same, and means carried by said cap for discharging a liquid in spray form from said second receptacle.

In testimony whereof, I have hereunto signed my name to this specification.

THOMAS A. DE VILBISS